United States Patent [19]

Sabel

[11] Patent Number: 5,247,848
[45] Date of Patent: Sep. 28, 1993

[54] BEARING FOR SUPPORTING THE SHIFT LEVER OF THE AUTOMOTIVE TRANSMISSION

[75] Inventor: Gustav Sabel, Cologne, Fed. Rep. of Germany

[73] Assignee: Ford Motor Company, Dearborn, Mich.

[21] Appl. No.: 912,474

[22] Filed: Jul. 13, 1992

[30] Foreign Application Priority Data

Aug. 22, 1991 [DE] Fed. Rep. of Germany ....... 4127730

[51] Int. Cl.$^5$ .................... B60K 20/00; F16C 11/00
[52] U.S. Cl. .................... 74/473 P; 403/135
[58] Field of Search .............. 74/473 R, 473 P; 403/76, 124, 122, 133, 135, 140, 277, 280

[56] References Cited

U.S. PATENT DOCUMENTS

| | | | |
|---|---|---|---|
| 4,504,166 | 3/1985 | Morin | 403/133 X |
| 4,577,989 | 3/1986 | Ito | 403/135 X |
| 4,646,585 | 3/1987 | Strohmeyer et al. | 74/473 P X |
| 4,790,682 | 12/1988 | Henkel | 403/135 X |
| 4,880,329 | 11/1989 | Sakai | 403/135 X |
| 5,105,676 | 4/1992 | Sabel et al. | 74/473 P X |

FOREIGN PATENT DOCUMENTS 8504691 5/1985 Fed. Rep. of Germany.
3742084 6/1989 Fed. Rep. of Germany.

Primary Examiner—Leslie A. Braun
Assistant Examiner—David W. Laub
Attorney, Agent, or Firm—Frank G. McKenzie; Roger L. May

[57] ABSTRACT

A gear shift lever bearing for automotive transmissions includes a ball socket formed of tough elastic material located in a bearing housing having multiple slots that define circular ball socket sectors. A ball, received in the ball socket, includes laterally guided tabs received in grooves formed in the socket. The bearing housing retains the ball socket in position by locking rings and a retaining ring. A shoulder of the ball socket includes multiple webs located in the slots and radial and axial supports that resiliently bear upon the cylindrical bore and the retaining ring.

10 Claims, 1 Drawing Sheet

BEARING FOR SUPPORTING THE SHIFT LEVER OF THE AUTOMOTIVE TRANSMISSION

BACKGROUND OF THE INVENTION

1. Field of the Invention

This invention relates to shift mechanisms for manual transmissions, particularly to a spherical bearing for supporting a gear shift lever.

2. Description of the Prior Art

German Patent Document DE 37 42 084 describes a gear shift lever bearing for a manual transmission. The bearing housing supports a one-piece ball socket of tough, resilient material having multiple radially directed slots and a ball fitted into the socket by opening the socket elastically. The bearing includes lateral guide tabs projecting into corresponding lateral guide grooves formed in the socket, and a retaining ring holding the ball socket in position in the bearing housing by an elastically resilient locking ring.

The locking ring is generally in the form of a O-ring or a corrugated spring lock washer, secured by a retaining ring in the form of a snap ring. The O-ring and the corrugated spring washer compensate for axial tolerances on the ball socket component and ensure that the ball fits in the socket without play.

Because the axially extending, generally radial slots remain open after assembly, the gear shift bearing of the '084 document has the disadvantage that the support of the upper part of the ball can become unstable when it is subjected to high load and stress. This result can occur because the corresponding sectors of the ball socket can become displaced.

German Patent Document DE-GM 85 04 691 describes a form of a modified upper locking ring, which is secured by a retaining ring to the outer circumference of the ball socket, thereby providing support for the individual sectors of the ball socket. However, even when a shift lever bearing is made in this way, the slots between the sectors of the ball socket remain open, so that the sectors can be displaced laterally under high loading.

SUMMARY OF THE INVENTION

It is an object of the invention to provide an improved gear shift lever bearing in which the ball is supported stably in all directions even under high loading.

According to the present invention, the locking ring, of tough resilient material, is located at the upper external circumference of the ball socket and includes multiple webs projecting into slots formed in the ball socket. Both the outer surface and the inner face of the locking ring contains radially and axially resilient tongues that resiliently support the locking ring against the bearing housing and retaining ring. By this means, tolerances in the plastic material component are compensated and the ball socket is locked in position. The webs of the locking ring that project into the slots of the balls socket prevent displacement of the sectors of the ball socket by locating the webs of the locking ring in the slots of the ball socket. By supporting a bearing housing on the retaining ring, reliable support of the ball even under high loading is ensured.

In one embodiment of the invention, multiple radial and axial supports are formed such that they cooperate with annular grooves and the bearing housing to retain correct axially positions among the components in a way that would otherwise be provided by a snap ring.

DESCRIPTION OF THE PREFERRED EMBODIMENT

Figure 1:
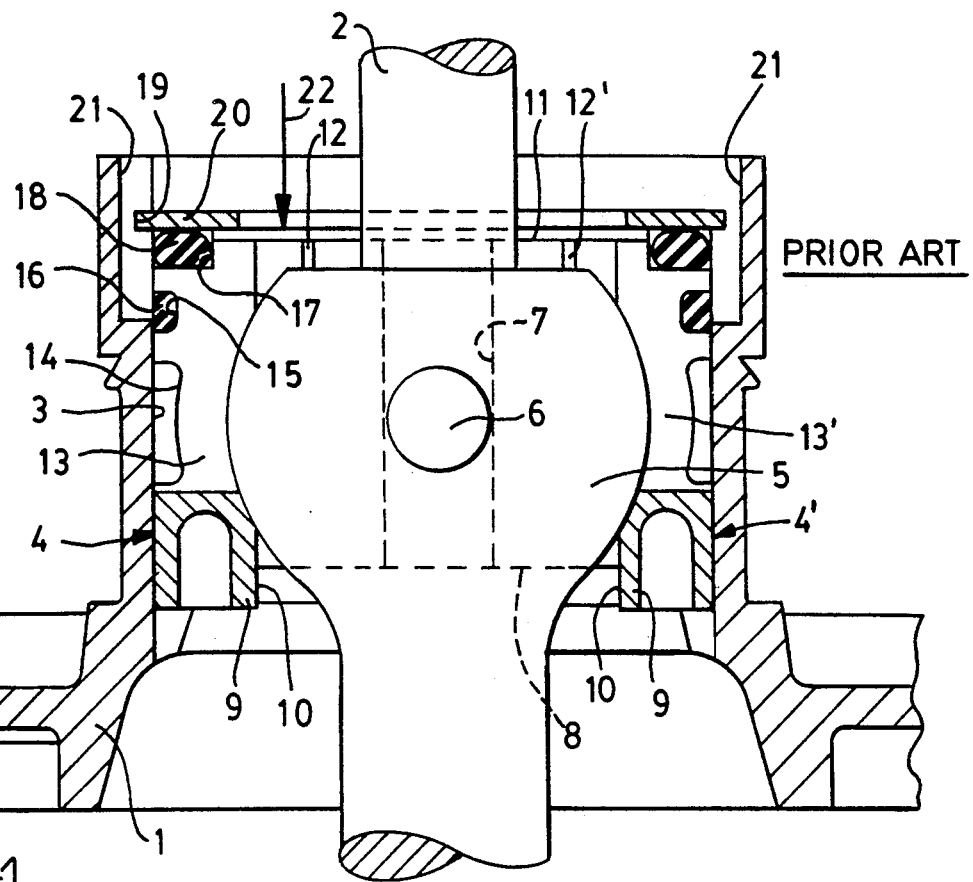
FIG. 1 is a cross section through a gear shift lever bearing in the prior art, the cross section being symmetric about the vertical axis.
Figure 2:
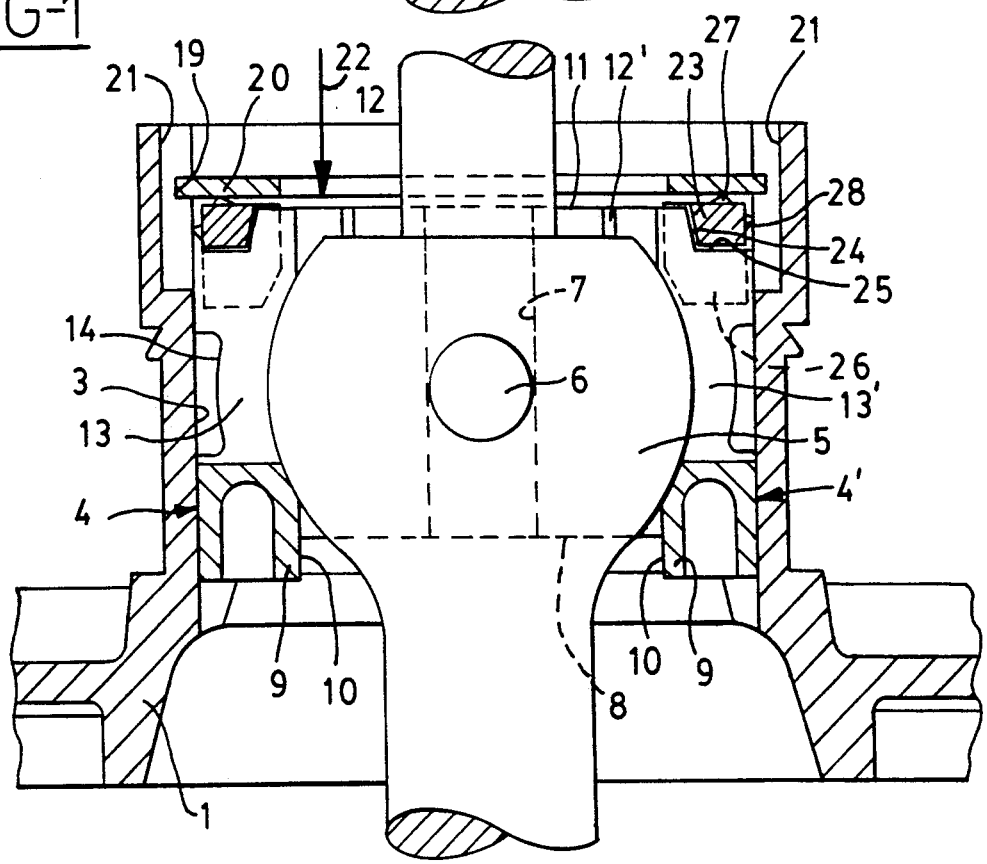
FIG. 2 is a cross section through a gear shift lever bearing according to the present invention, the cross section being symmetric about the vertical axis.

In the figure, a gear shift lever 2 is received in a bearing housing 1. A cylindrical bore 3 is formed in the housing and a one-piece ball socket 4 is located within the bore. A ball 5, received within the socket 4, is formed integrally with or moulded onto the gear shift lever 2.

Laterally projecting guide tabs 6 are formed on the ball 5 and cooperate with corresponding lateral guide grooves 7 in the ball socket 4 to define the neutral plane of the gear shift lever bearing. The ball socket 4, of tough, resilient material, is provided on an end face 8 with axially projecting extensions 9 that engage in corresponding recesses 10 formed in the bearing housing 1, thereby securing it against twisting.

The ball socket 4 is provided with slots 12 extending axially from its end face 11. The slots run generally radially and thus form a plurality of radially resilient sectors 13, whose radial is further increased by an annular recess 14 formed on the ball socket 4.

The ball socket is provided in its upper region with a circumferential annular groove 15, which receives a radially resilient O-ring 16. The ball socket includes a shoulder 17 located on its upper end face 11, the shoulder being sized to receive an axially resilient O-ring 18.

The cylindrical bore 3 in the bearing housing 1 is provided with a circumferential annular groove 19 to receive a retaining ring, e.g. a snap ring or circlip 20. Two axial grooves 21, provided in the upper region of the cylindrical bore 3 of the bearing housing 1, facilitate disassembly of the retaining ring 20.

The shift lever bearing illustrated in the left-hand side of the figure, is assembled by first springing the sectors 13 radially open and inserting ball 4 in the axial direction, the direction of arrow 22, into the ball socket while it is located outside the bearing housing. The two O-rings 16 and 18 are then fitted into grooves 15, shoulder 17, respectively. The subassembly is pushed axially into the cylindrical bore 3 in the bearing housing 1. O-ring 16 compensates for radial tolerances, which in the case of plastic material components can be quite large, and provides a desired resilient pressure of the sectors 13 on ball 5.

The other O-ring 18 compensates for axial tolerances, which are likewise of considerable magnitude, after retaining ring 20 has been fitted in the annular groove 19.

In the arrangement shown at the left-hand side of the figure, it is possible that, when considerable lateral force acts on ball 5, some sectors are displaced laterally such that their adjoining slots 12 close. This action, however, causes an undesirable departure from the spherical form of the bearing.

According to the invention, which is illustrated in the right-hand side of the figure, such an undesired displacement of the sectors 13 is avoided.

According to the present invention, avoidance of undesired displacement of the sectors 13 is achieved by forming a locking ring 23 of tough elastic material adapted to the inclined upper outer circumference 24 of the shoulder 25 of the ball socket 4'. A number of webs 26 is moulded onto the locking ring 23, the webs corresponding in number and form to the slots 12'. Webs 26 project into the slots 12'. The locking ring is formed, at its end face and on its outer circumference respectively, with axially and radially resilient tongues 27 and 28.

Webs 26, moulded onto the locking ring 23, extend into the upper region of slots 12' between the sectors 13', thereby preventing any lateral displacement of the radially resilient sectors 13 in the event a substantial lateral force acts laterally through ball 5. This avoids undesired deformation from the precisely spherical form and the associated inaccurate support of the ball 5 that can occur in the bearing shown at the left-hand side of the figure.

Tongues 27 are resilient in the axial direction; tongues 28 are resilient in the radial direction. Through operation of tongues 27 and 28, the locking ring 23 is supported against the cylindrical bore 3 and the retaining ring 20 and takes over the tolerance-compensating elastic functions of the two O-rings 16, 18.

By forming the upper outer circumference 24 of ball socket 4' with a conical surface inclined at an angle greater than that giving rise to self-locking, any desired preload can be applied while inserting the locking ring 23 to obtain absolute freedom from play in the bearing.

According to a further embodiment of the invention. The axially and radially resilient tongues 27, 28 located on locking ring 23, are shaped so that they contact directly surfaces of annular groove 19 in the cylindrical bore 3 of the bearing housing 1 without the aid of the retaining ring 20. In this case, the securing or snap ring 20 can also be omitted.

It is possible to modify the embodiment shown in the figure in several ways. For example, securing the ball socket against twisting can be effected by suitably shaping the locking ring so that it is held securely against twisting, e.g. in groove 21 of cylindrical bore 3 by corresponding radially resilient tongues 28.

The gear shift lever bearing illustrated on the right-hand side of the figure is assembled by first opening the sectors 13' of ball socket 4' and inserting ball 5 in the ball socket while the socket is located outside bearing housing. Locking ring 23 is then inserted into the housing, in the direction of arrow 22, so that with 26 are located within corresponding slots 12' of the ball socket 4'. The entire subassembly is then inserted into the cylindrical bore 3 in the bearing housing 1. Retaining ring 20 is then fitted into its annual groove 19. The axial and radial resilient tongues 27 and 28 of locking ring 23 force ring 23 into contact with matching outer circumference 24, 25 on the ball socket 4' so that axial and radial manufacturing tolerance are taken up resiliently in order to ensure that the shift lever 2 is mounted in a ball-and-socket bearing free from play.

I claim:

1. A bearing for pivotably supporting a gearshift lever, comprising:
   a socket having an inner surface of at least partially spherical contour, said inner surface formed with slots;
   a ball located in the socket; and
   a locking ring surrounding the socket, located at a first axial end thereof, having webs projecting into the slots of the socket, and resilient tongues extending radially and longitudinally outward therefrom, the tongues urged by interference contact with fixed surfaces to force the socket into contact with the ball.

2. The bearing of claim 1 further comprising:
   a housing having a bore surrounded by a wall, the wall encircling the socket; and
   a removable retaining ring located within the bore of the housing, fixed to the housing against displacement, the housing and retaining ring having surfaces thereon located for resilient contact with the tongues of the locking ring, said contact continually urging the socket into contact with the ball.

3. The bearing of claim 1 wherein:
   the inner surface of the socket contains grooves directed along an axis parallel to a neutral position of the gearshift layer; and
   the ball further comprises tabs extending laterally from the ball into the grooves of the socket, the grooves and tabs defining a neutral plane of the gearshift lever bearing.

4. The bearing of claim 1 wherein the socket has a recess extending circumferentially around the socket, the recess having adjacent surfaces, one surface inclined with respect to the other surface; and
   the locking ring is located in said recess formed in the socket and forces the locking ring radially toward the socket.

5. The bearing of claim 1 wherein the socket has a recess extending circumferentially around the socket, the recess having adjacent surfaces, one surface being a conical surface inclined radially toward the socket and longitudinally with respect to the other surface; and
   the locking ring is located in said recess formed in the socket and forces the locking ring radially toward the socket and the socket into locking contact with the ball.

6. A bearing for pivotably supporting a gearshift lever, comprising:
   housing means defining a space therein, for supporting the contents of said space;
   a socket located within the housing means having an inner surface of at least partially spherical contour, said inner surface formed with slots;
   a ball located in the socket; and
   a locking ring surrounding the socket, located at a first axial end thereof, having webs projecting into the slots of the socket, and resilient tongues extending radially and longitudinally outward therefrom, the tongues urged by interference contact with the housing to force the socket into contact with the ball.

7. The bearing of claim 6 wherein the housing means comprises:
   a housing having a bore surrounded by a wall, the wall encircling the socket; and
   a removable retaining ring located within the bore of the housing, fixed to the housing against displacement, the housing and retaining ring having surfaces thereon located for resilient contact with the tongues of the locking ring, said contact continually urging the socket into contact with the ball.

8. The bearing of claim 6 wherein:
   the inner surface of the socket contains grooves directed along an axis parallel to a neutral position of the gearshift lever; and the ball further comprises tabs extending laterally from the ball into the grooves of the socket, the grooves and tabs defining a neutral plane of the gearshift lever bearing.

9. The bearing of claim 6 wherein the socket has a recess extending circumferentially around the socket, the recess having adjacent surfaces, one surface inclined with respect to the other surface; and the locking ring is located in said recess formed in the socket, contact of the tongues on the fixed surfaces forcing the locking ring radially toward the socket.

10. The bearing of claim 6 wherein the socket has a recess extending circumferentially around the socket, the recess having adjacent surfaces, one surface being a conical surface inclined radially toward the socket and longitudinally with respect to the other surface; and the locking ring is located in said recess formed in the socket, contact of the tongues on the fixed surfaces forcing the locking ring radially toward the socket and the socket into locking contact with the ball.

* * * * *